① United States Patent  
Fukumoto et al.

(10) Patent No.: US 7,465,346 B2
(45) Date of Patent: Dec. 16, 2008

(54) BLACK INK COMPOSITION, INK SET, INK CARTRIDGE, INKJET RECORDING METHOD AND RECORDED PRODUCT

(75) Inventors: Hiroshi Fukumoto, Shiojiri (JP); Kazuhiko Kitamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 46 days.

(21) Appl. No.: 11/747,282

(22) Filed: May 11, 2007

(65) Prior Publication Data

US 2007/0263056 A1 Nov. 15, 2007

(30) Foreign Application Priority Data

May 12, 2006 (JP) ............................. 2006-133557

(51) Int. Cl.
*C09D 11/00* (2006.01)
*C09D 11/02* (2006.01)
*B41J 2/01* (2006.01)

(52) U.S. Cl. ................ 106/31.48; 106/31.5; 106/31.52; 106/31.58; 106/31.59; 347/100

(58) Field of Classification Search ................ 106/31.5, 106/31.48, 31.52, 31.58, 31.59; 347/100
See application file for complete search history.

(56) References Cited

U.S. PATENT DOCUMENTS

| 7,056,376 | B2* | 6/2006 | Popat et al. ................ 106/31.5 |
| 7,083,670 | B2 | 8/2006 | Takasaki et al. | |
| 7,094,279 | B2* | 8/2006 | Hanmura et al. ......... 106/31.52 |
| 2005/0204952 | A1 | 9/2005 | Wachi et al. | |
| 2007/0109376 | A1* | 5/2007 | Tojo et al. .................. 106/31.5 |
| 2007/0139499 | A1* | 6/2007 | Yabuki et al. .............. 106/31.5 |

FOREIGN PATENT DOCUMENTS

| JP | 06-025575 | 2/1994 |
| JP | 07-228810 | 8/1995 |
| JP | 2005-120346 | 5/2005 |
| JP | 2005-307177 | 11/2005 |
| JP | 2006-76908 | 3/2006 |

OTHER PUBLICATIONS

Patent Abstracts of Japan of JP 06-025575 dated Feb. 1, 1994.
Patent Abstracts of Japan of JP 07-228810 dated Aug. 29, 1995.
Patent Abstracts of Japan of JP 2006-076908 dated Mar. 23, 2006.

* cited by examiner

*Primary Examiner*—Helene Klemanski
(74) *Attorney, Agent, or Firm*—Ladas and Parry LLP

(57) ABSTRACT

A black ink composition comprising a colorant represented by Formula 1 below same as claim 1 and a colorant represented by Formula 2 below same as claim 1.

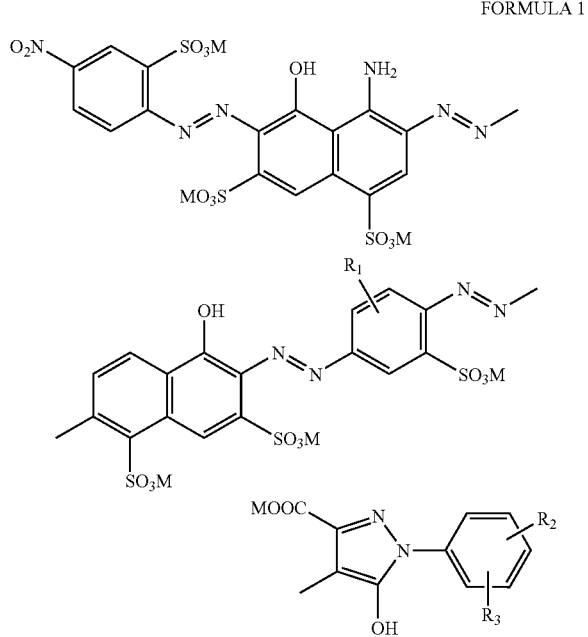

$A_1-N=N-A_2-N=N-A_3$     FORMULA 2

17 Claims, No Drawings

BLACK INK COMPOSITION, INK SET, INK CARTRIDGE, INKJET RECORDING METHOD AND RECORDED PRODUCT

BACKGROUND

1. Technical Field

The present invention relates to a black ink composition suitable for an inkjet recording method wherein not only is print quality enhanced and image fastness of a printed product guaranteed, but also bronzing is suppressed, fastness of a recorded matter (printed product) is excellent, and a beautiful black color can be sustained for a long period of time; an ink set comprising the aforementioned black ink composition; an ink cartridge containing the aforementioned black ink composition; and an inkjet recording method and recorded matter using the same.

In addition, the present invention relates to a black ink composition that approaches achromicity under medium duty conditions wherein the aforementioned properties are retained and the hue of the printed product is guaranteed by mixing therewith a specific complementary coloring material; an ink set comprising the aforementioned black ink composition; an ink cartridge containing the aforementioned black ink composition; and an inkjet recording method and recorded matter using the same.

2. Related Art

The inkjet method is a method wherein ink droplets are ejected from a fine nozzle head, and letters and graphics are recorded on the surface of a recording medium such as paper and the like. Inkjet recording methods that have reached practical application include a method wherein electric signals are converted to mechanical signals using piezoelectric elements, ink droplets stored in the nozzle head member are ejected intermittently therefrom, and letters and symbols are recorded on the surface of the recording medium; and a method wherein portions of ink liquid are rapidly heated at members near the nozzle head ejecting member to generate bubbles, ink droplets are ejected intermittently by the expansions in volume caused thereby, and letters and symbols are recorded on the surface of the recording medium.

Inks used in inkjet recording are generally those wherein based on their safety and printing properties, various colorants are dissolved in water, an organic solvent, or a mixture thereof, but more stringent conditions are required than for the ink compositions used in writing instruments such as fountain pens and ball point pens.

For example, when high duty printing such as solid printing (printing with a 100% duty fill) is performed on a substrate such as gloss paper and the like, places that should appear as ordinary white light can appear to be colored when observed under specular reflection conditions, and differences between the recording medium itself (non-inked parts) and the reflected light arise, giving the impression that the printed part is floating. This is due to coagulation of the colorants that is generally called bronzing, and is a factor that makes the printed letters and figures difficult to see. This phenomenon is often conspicuous with strongly weather-resistant colorants, and improvement is needed.

Especially in the case of black ink, bronzing causes a change in hue and decrease in coloring that result in the loss of image sharpness, a problem that strongly needs to be resolved.

This problematic bronzing phenomenon is caused by the crystallization of the dye when the ink composition dries on the surface of the paper. Therefore, the following methods have generally been used to correct bronzing.

The first method is one wherein an alcohol-amine is added to the ink composition as a pH stabilizer. This method corrects bronzing by improving the solubility of the dye.

The second method increases the penetration of the ink composition into the paper. This method corrects bronzing by causing the ink composition to penetrate into the paper before the dye crystallizes.

However, the first method has the following problems: (1) the alcohol amine raises the pH of the ink composition to near 11, and when this ink composition is used in an inkjet printer, corrosion of the printer nozzles occurs, and (2) because modern highly weather-resistant colorants have poor storage stability in an alkali environment, when a highly weather-resistant colorant is used as the coloring agent, the storage stability of the ink composition deteriorates.

Moreover, the second method has the following problems: (1) the penetration of the ink composition changes depending on the type and properties of the paper, and (2) when the penetration of the ink into the paper is excessive, so-called bleeding occurs as well as other decreases in printing quality.

Therefore, the correction of bronzing by adding an amino acid to the ink composition has been proposed in place of adding a pH stabilizer or increasing the penetration of the ink composition (JP-A-6-25575 and JP-A-7-228810).

However, the effectiveness in inhibiting bronzing by the addition of an amino acid was insufficient when a highly weather-resistant colorant was used as the coloring agent.

SUMMARY

An advantage of some aspects of the invention is: through the use of a mixture of the colorant represented by Formula 1 and the colorant represented by Formula 2, to provide an ink composition that can not only resolve the aforementioned problems, enhance print quality, and guarantee image fastness of a printed product printed by the inkjet recording method, but can also inhibit bronzing, and sustain a beautiful black color for a long period of time.

Another advantage of some aspects of the invention is: through the use of a mixture of the colorant represented by Formula 1 and the colorant represented by Formula 2, to provide an ink composition that can not only resolve the aforementioned problems and inhibit bronzing of a printed product printed by the inkjet recording method, but can also have excellent light fastness and ozone fastness, and by mixing therewith the colorant represented by Formula 8, can guarantee color hue, can approach achromicity, especially under medium duty conditions, can be highly effective in inhibiting bronzing, and can sustain a beautiful black color for a long period of time.

To solve the aforementioned problems the present invention utilizes the following structure.

(1) A black ink composition comprising a colorant represented by Formula 1 below and a colorant represented by Formula 2 below:

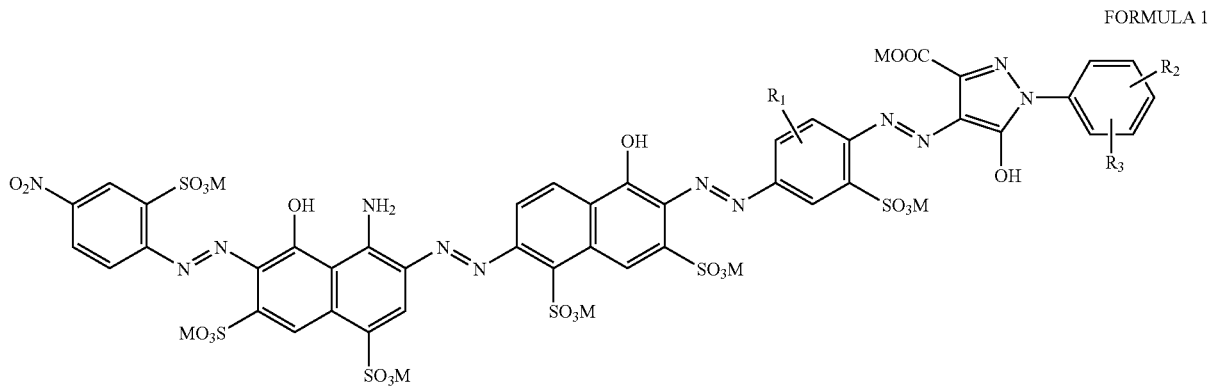

FORMULA 1

(wherein $R_1$ represents either a halogen atom, H, $SO_3M$ or COOM, $R_2$ and $R_3$ each independently represent H, $SO_3M$ or COOM, and M represents Li or Na, however, a structure in which both $R_2$ and $R_3$ are H is excluded therefrom);

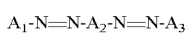

FORMULA 2

(wherein $A_1$ is a substituent represented by Formula 3 or Formula 4 below, $A_2$ is a substituent represented by Formula 5 or Formula 6 below, and $A_3$ is a substituent represented by Formula 7 below);

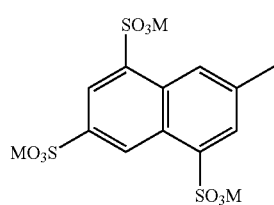

FORMULA 3

(wherein M represents Li or Na);

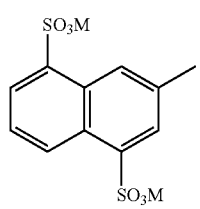

FORMULA 4

(wherein M represents Li or Na);

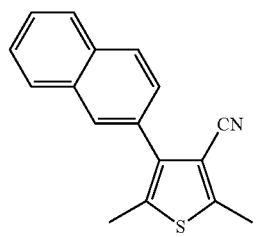

FORMULA 5

FORMULA 6

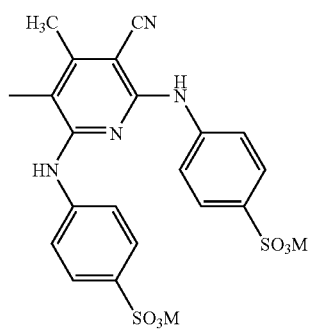

FORMULA 7

(wherein M represents Li or Na).

(2) The black ink composition according to (1), wherein the total of the content of the colorant represented by Formula 1 and the content of the colorant represented by Formula 2 is 5 to 8 wt. % of the ink composition.

(3) The black ink composition according to (1) or (2), wherein the content ratio of the colorant represented by Formula 1 to the colorant represented by Formula 2 is 2:1 to 1:2.

(4) The black ink composition according to any of (1) to (3), further containing a colorant represented by Formula 8 below:

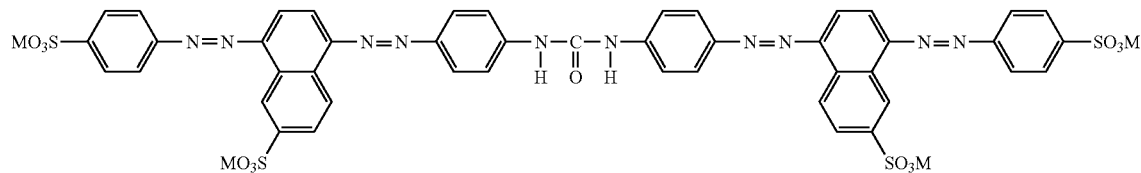

FORMULA 8

(wherein M represents Li or Na).

(5) The black ink composition according to (4), wherein the colorant represented by Formula 8 is the colorant represented by Formula 8-1.

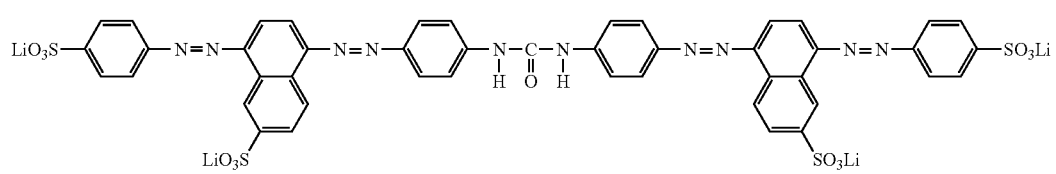

FORMULA 8-1

(6) The black ink composition according to any of (1) to (5), further containing C.I. Direct Yellow 86 as a colorant.

(7) The black ink composition according to any of (1) to (6), containing a nonionic surfactant.

(8) The black ink composition according to (7), wherein the nonionic surfactant is an acetylene glycol surfactant.

(9) The black ink composition according to (7) or (8) containing 0.1 to 5 wt. % nonionic surfactant.

(10) The black ink composition according to any of (1) to (9), further containing a penetration enhancer.

(11) The black ink composition according to (10) wherein the penetration enhancer is a glycol ether.

(12) The black ink composition of any of (1) to (11) wherein the pH is 7.0 to 8.5 at 20° C. immediately after preparation of the ink composition.

(13) The black ink composition according to any of (1) to (12) containing an organic acid and/or an organic base as a pH regulator.

(14) An ink cartridge accommodating the black ink composition according to any of (1) to (13) independently or integrally with ink of another color.

(15) An inkjet recording method wherein recording is performed by ejecting droplets of the black ink according to any of (1) to (13) and causing the same to adhere to a recording medium.

(16) The inkjet recording method according to (15) that is a recording method using an inkjet head in which ink droplets are formed by mechanical deformation of a piezoelectric element.

(17) A recorded matter recorded by the inkjet recording method according to (15) or (16).

Through the use of a mixture of the colorant represented by Formula 1 and the colorant represented by Formula 2, the present invention can provide an ink composition that can not only resolve the aforementioned problems, enhance print quality, and guarantee image fastness of a printed product printed by the inkjet recording method, but can also inhibit bronzing, and sustain a beautiful black color for a long period of time.

In addition, through the use of a mixture of the colorant represented by Formula 1 and the colorant represented by Formula 2, the present invention can provide an ink composition that not only can resolve the aforementioned problems and inhibit bronzing of a printed product printed by the inkjet recording method, but can also have excellent light fastness and ozone fastness, and by mixing therewith the colorant represented by Formula 8, can guarantee color hue, can approach achromicity, especially under medium duty conditions, can be highly effective in inhibiting bronzing, and can sustain a beautiful black color for a long period of time.

DESCRIPTION OF THE PREFERRED EMBODIMENTS

The ink composition of the present invention contains the colorant represented by Formula 1 below and the colorant represented by Formula 2 below, and as needed can contain surfactant, penetration enhancer, and other additives.

FORMULA 1

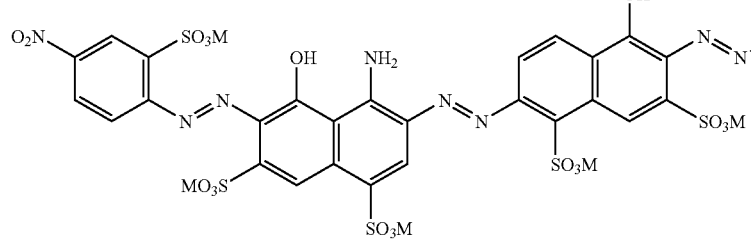

(wherein $R_1$ represents either a halogen atom, H, $SO_3M$ or COOM, $R_2$ and $R_3$ each independently represent H, $SO_3M$ or COOM, and M represents Li or Na. However, the structure wherein both $R_2$ and $R_3$ are H is excluded therefrom).

$$A_1\text{-}N{=}N\text{-}A_2\text{-}N{=}N\text{-}A_3 \quad \text{FORMULA 2}$$

(wherein $A_1$ is a substituent represented by Formula 3 or Formula 4 below, $A_2$ is a substituent represented by Formula 5 or Formula 6 below, and $A_3$ is a substituent represented by Formula 7 below).

FORMULA 3

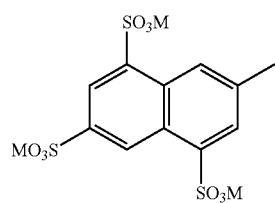

(wherein M represents Li or Na);

FORMULA 4

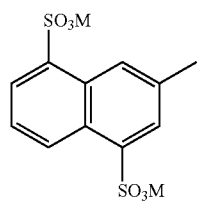

(wherein M represents Li or Na);

FORMULA 5

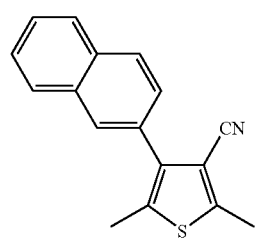

FORMULA 6

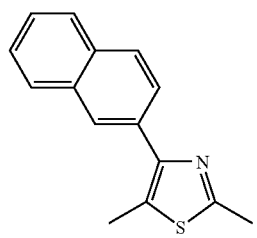

FORMULA 7

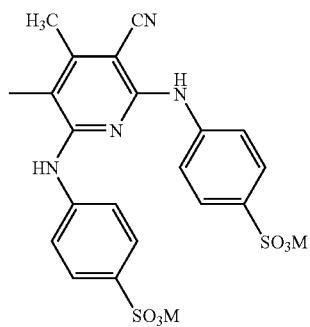

(wherein M represents Li or Na)

(Colorants)

As a colorant in the present invention, the colorant represented by Formula 1 below is contained therein as a first component thereof. The colorant represented by Formula 1 below can be used as one type independently or can be used as a mixture of two or more types thereof.

The colorants of Formula 1-1, Formula 1-2, and Formula 1-3 below can be listed as specific examples of the colorant represented by Formula 1 above. These colorants can be used as one type independently or can be used as a mixture of two or more types thereof.

FORMULA 1-1

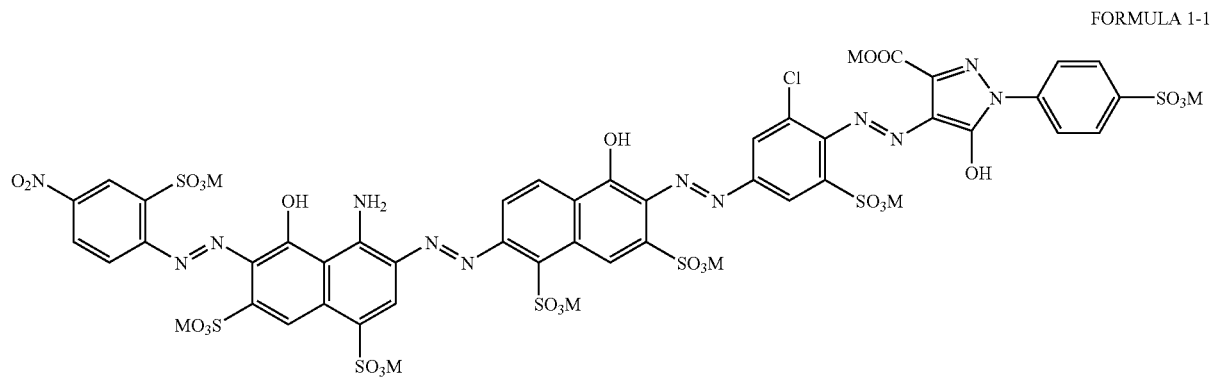

(wherein M represents Li or Na. However, all M cannot be Na.)

FORMULA 1-2

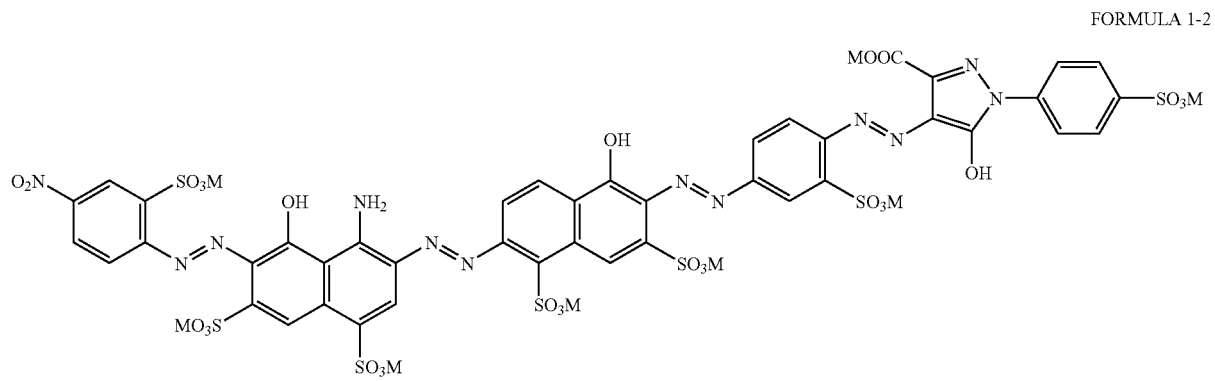

(wherein M represents Li or Na. However, all M cannot be Na.)

FORMULA 1-3

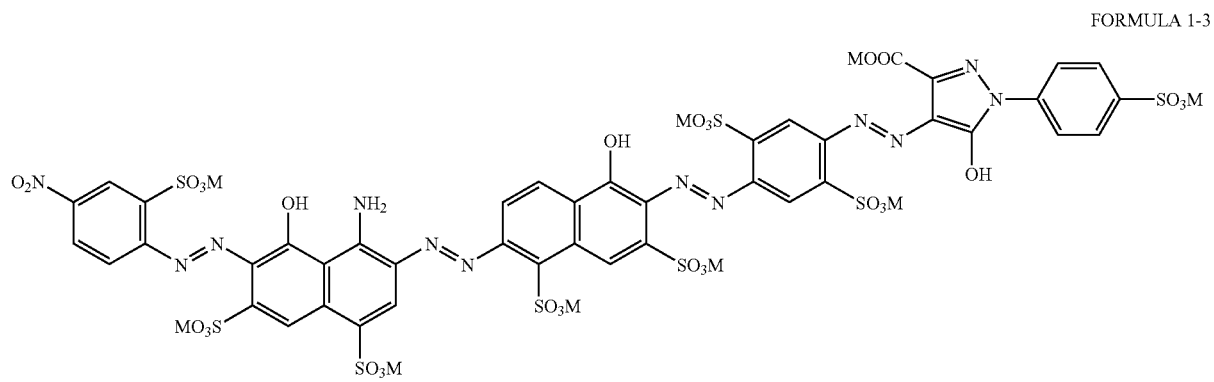

(wherein M represents Li or Na. However, all M cannot be Na.)

As a colorant in the present invention, the colorant represented by Formula 2 below is contained therein as a second component thereof. The colorant represented by Formula 2 below can be used as one type independently or can be used as a mixture of two or more types thereof.

$$A_1-N=N-A_2-N=N-A_3 \quad \text{FORMULA 2}$$

(wherein $A_1$ is a substituent represented by Formula 3 or Formula 4 below, $A_2$ is a substituent represented by Formula 5 or Formula 6 below, and $A_3$ is a substituent represented by Formula 7 below).

FORMULA 3
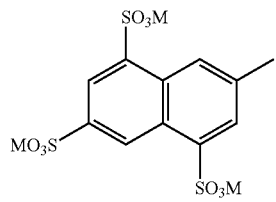
(wherein M represents Li or Na);
FORMULA 4
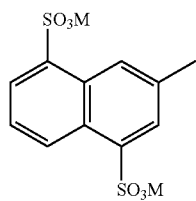
(wherein M represents Li or Na);
FORMULA 5
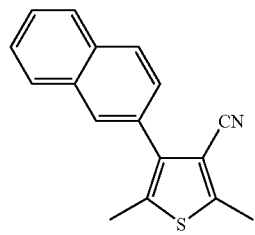
-continued
FORMULA 6
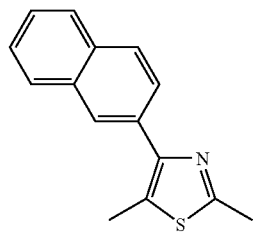
FORMULA 7
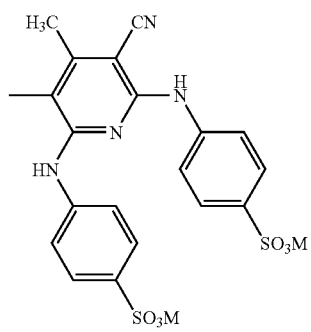
(wherein M represents Li or Na)
TABLE 1
| | $A_1$ | $A_2$ | $A_3$ |
|---|---|---|---|
| FORMULA 2-1 | 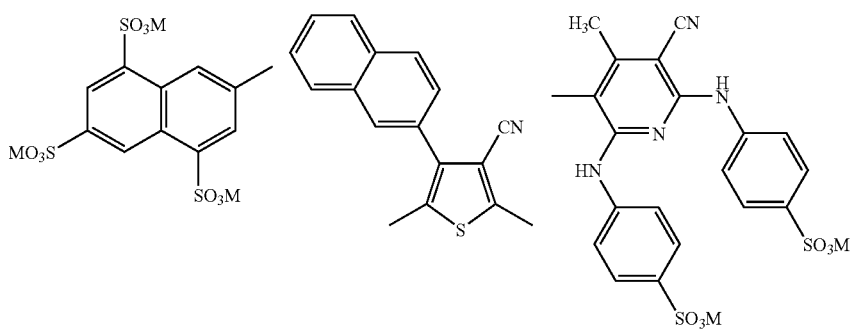 | | |

TABLE 1-continued

| | $A_1$ | $A_2$ | $A_3$ |
|---|---|---|---|
| FORMULA 2-2 | | | |
| FORMULA 2-3 | | | |
| FORMULA 2-4 | | | |

IN TABLE 1 M REPRESENTS Li OR Na.

The present invention does not particularly limit the content ratio of the colorant represented by Formula 1 and the colorant represented by Formula 2, but a range of 2:1 to 1:2 is preferred. If the content ratio of either the colorant represented by Formula 1 or the colorant represented by Formula 2 is too high, bronzing can occur more easily in some cases. On the other hand, if the content ratio of the colorant represented by Formula 1 is too high, the product may have inferior ozone fastness, and if the content ratio of the colorant represented by Formula 2 is too high, the product may have inferior color development on matte paper.

In addition, in the present invention a black ink composition having a bronzing inhibitory effect and wherein the hue can be adjusted to approach achromicity under medium duty conditions can be obtained by adding the colorant represented by Formula 8 below.

FORMULA 8

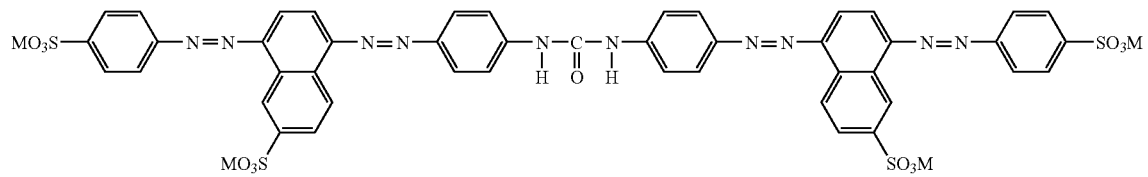

(wherein M represents Li or Na)

The colorants shown in Formula 8-1 and Formula 8-2 below can be listed as specific examples of the colorant represented by Formula 8 above.

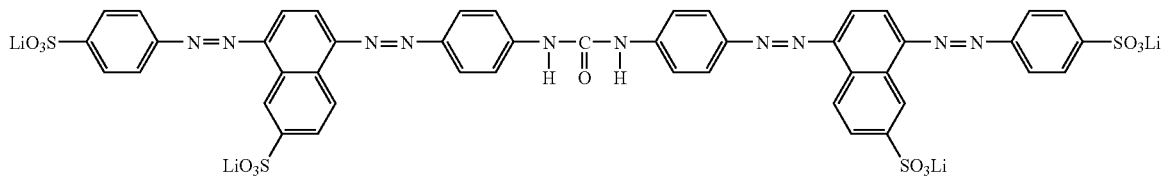

FORMULA 8-1

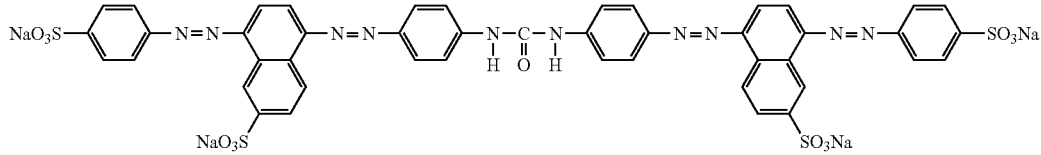

FORMULA 8-2

The ratio of the total content of the colorant represented by Formula 1 and the colorant represented by Formula 2 to the content of the colorant represented by Formula 8 is preferably 4:1 to 7:1 from the standpoint of guaranteeing the desired hue.

Furthermore, adding both the colorant represented by Formula 8 above and C.I. Direct Yellow 86 facilitates bringing the hue closer to achromicity and enables more precise hue adjustment than when only the colorant represented by Formula 8 is added.

The ratio of the total content of the colorant represented by Formula 1 and the colorant represented by Formula 2 to the total content of the colorant represented by Formula 8 and C.I. Direct Yellow 86 is preferably 3:1 to 5:1 from the standpoint of guaranteeing the desired hue.

(Surfactants)

Nonionic surfactants, cationic surfactants and anionic surfactants can be listed as the surfactant used in the present invention, but among these a nonionic surfactant is preferred because not only can rapid fixing (penetration) can be obtained, but at the same time it is an effective additive for preserving the roundness of a single dot.

An acetylene glycol surfactant can be listed as an example of the aforementioned nonionic surfactant. More specifically, Surfynol 465 and Surfynol 104 (Air Products Japan, Inc.) and Olfine STG and Olfine E1010 (Nissin Chemical Industry Co., Ltd.), etc., can be listed as acetylene glycol surfactants.

The amount of the above nonionic surfactant added to the ink composition is preferably 0.1 to 5 wt. %, and more preferably 0.5 to 2 wt. %. If the added amount of the above nonionic surfactant in the ink composition is at least 0.1 wt. %, pronounced penetration of the material to be printed can be obtained when printing is performed using the ink composition of the present invention, and if the added amount is no more than 5 wt. %, excellent image sharpness can be maintained.

(Penetration Enhancers)

The present invention does not particularly limit the penetration enhancer used therein, but a glycol ether is preferred therefor.

Examples of the above glycol ethers include ethylene glycol mono butyl ether, diethylene glycol mono butyl ether, triethylene glycol monoethyl ether, propylene glycol monomethyl ether, dipropylene glycol monoethyl ether, propylene glycol mono butyl ether, dipropylene glycol mono butyl ether, and triethylene glycol mono butyl ether. Among the above, triethylene glycol mono butyl ether is preferred.

If the added amount of the above penetration enhancer in the ink composition is at least 3 wt. %, bleeding of the black colorant can be prevented when solid printing is performed using the ink composition of the present invention, and if the added amount is no more than 30 wt. %, the printed product can be maintained without causing oily separation of the glycol ether.

(Other Additives)

A pH regulator can be added to the ink composition of the present invention.

The present invention does not particularly limit the pH adjuster used therein, and a variety of compounds can be used therefor. Examples include inorganic acids such as sulfuric acid, hydrochloric acid, nitric acid, etc.; inorganic bases such as lithium hydroxide, sodium hydroxide, potassium hydroxide, etc.; organic bases such as ammonia, triethanolamine, diethanolamine, monoethanolamine, tri-isopropanol amine, etc.; and organic acids such as adipic acid, citric acid, succinic acid, etc. Among the above, an organic acid and/or organic base is preferred as a pH regulator.

More specifically, the pH buffering capability is greater when an organic acid and organic base are used in combination than when an inorganic acid and an inorganic base, an inorganic acid and an organic base, or an organic acid and an inorganic base are used in combination. Thus, the use of an organic acid and an organic base in combination provides greater effectiveness in suppressing pH fluctuations, the pH of the ink rarely falls below 7.0 even after the passage of time, and corrosion of the nozzle plate can be prevented.

A humectant can also be added to the ink composition of the present invention.

Water-miscible organic solvents, sugars, and the like can be listed as the above humectant, but from the standpoint of moisture preservation effectiveness, a water-miscible organic solvent is preferred.

The term water-miscible organic solvent above refers to a medium capable of dissolving a solute, and it can be selected from water-miscible solvents that are organic and have a vapor pressure lower than water. Specific examples include polyhydric alcohols such as propylene glycol, butanediol, pentanediol, 2-butene-1,4-diol, 2-methyl-2,4-pentanediole, 1,2,6-hexanetriol, diethylene glycol, triethylene glycol, dipropylene glycol, 1,2-alkanediol, etc.; alkyl alcohols such as methyl alcohol, ethyl alcohol, n-propyl alcohol, n-butyl alcohol, etc.; ketones such as acetonyl acetone, etc.; esters such as y-butyrolactone, triethyl phosphate, etc.; furfuryl alcohol, tetrahydrofurfuryl alcohol, thiodiglycol, glycerin, and the like. Among the above, glycerin and 1,2-hexanediol are preferred.

Antioxidants and UV light absorbing agents can also be added to the ink composition of the present invention.

The present invention does not particularly limit the above antioxidants and UV light absorbing agents used therein, and a variety of compounds can be used therefor. Examples include allophanates such as allophanate, methyl allophanate, etc.; biurets such as biuret, dimethyl biuret, tetramethyl biuret, etc.; L-ascorbic acid and salts thereof, and the like.

Preservatives and fungicides can also be added to the ink composition of the present invention.

The present invention does not particularly limit the above preservatives and fungicides used therein, and a variety of compounds can be used therefor. Examples include sodium benzoate, sodium pentachlorophenol, sodium 2-pyridi-nethiol-1-oxide, sodium sorbate, sodium dehydroacetate, 1,2-dibenzisothiazolin-3-one (Proxel CRL, Proxel BDN, Proxel GXL, Proxel XL-2, Proxel TN manufactured by Ave-cia Ltd.) and the like.

The primary solvent contained in the ink composition of the present invention is water.

Purified water or ultrapure water such as ion exchange water, ultrafiltered water, reverse osmosis water, distilled water and the like can be used as the water therein. The use of water wherein a sterilization treatment by UV light exposure or addition of hydrogen peroxide and the like is especially preferred from the aspect of preventing the growth of mold and bacteria, thereby enabling the long term storage of the ink composition.

Immediately after preparation thereof, the ink composition of the present invention has a pH of 7.0 to 8.5 at 20° C. The above pH can be adjusted as needed by adding the above pH regulator.

If the pH of the ink composition at 20° C. is too low, the eutectoid coating of the inkjet head of the inkjet printer may peel off, and if the pH is too high, the inkjet printer nozzles may become corroded. By making the pH of the ink composition 7.0 to 8.5 at 20° C. the aforementioned damage will not occur, and an increase in both stabilization of the ejection properties and the storage stability of the ink composition will be seen. The preferred range for the pH is 7.5 to 8.0.

The ink set of the present invention can be obtained by using the black ink composition of the present invention in combination with ink compositions of other colors. The above ink compositions of other colors can be obtained by using a conventional yellow ink composition, magenta ink composition, and cyan ink composition in combination.

The ink cartridge of the present invention can be obtained by placing the above ink compositions integrally into a single container (cartridge) having partitions therein, and the above ink compositions can also be placed in separate containers (cartridges) independently. A conventional ink cartridge can be used as the above container, and among the above, an ink cartridge for an ink jet printer is preferred therefor.

The ink composition of the present invention can be suitably used in writing instruments such as pens and the like, and for stamps and the like, but it is can be used more suitably as an ink composition for inkjet recording.

The term inkjet recording method in the present invention refers to a method whereby an ink composition is ejected from a fine nozzle as droplets, and the droplets are caused to adhere to a recording medium. A more specific explanation thereof follows.

A first method is a technique involving electrostatic attraction, and is a technique wherein recording is performed by applying a strong electric field between accelerating electrodes located on a nozzle and in front of the nozzle, ink is continuously ejected in the form of droplets from the nozzle, and as the ink droplets pass between deflection electrodes, a print data signal is provided to the deflection electrodes, or the ink droplets are ejected without deflection in response to the print data signal.

A second method is a technique wherein pressure is applied to a liquid ink using a small pump, and ink droplets are forcefully ejected therefrom by mechanically causing the nozzle to oscillate using a crystal oscillator. Recording is performed by charging the ejected ink droplets simultaneously with the ejection thereof, and as the ink droplets pass between deflection electrodes, providing a print data signal to the deflection electrodes.

A third method is a technique using a piezoelectric element wherein recording is performed by applying pressure to liquid ink using the piezoelectric element simultaneously with a print data signal, and ejecting an ink droplet thereby.

A fourth method is a technique wherein recording is performed by causing a rapid volumetric expansion of liquid ink through the action of thermal energy such that the liquid ink is heated by a microelectrode to form a bubble in accordance with a print data signal, and an ink droplet is then ejected thereby.

Any of the above techniques can be used in the inkjet recording method using the ink of the present invention, and an inkjet cartridge for each technique can be filled therewith.

The present invention does not particularly limit the recording medium used therein, and examples include paper (Xerox P™ manufactured by Fuji Xerox Co. Ltd., Xerox 4024™ manufactured Xerox Corporation, USA); Ultra Premium Photo Paper Glossy (Shashin-youshi Kurisupia <Koukoutaku>)™ manufactured by Seiko Epson Co., Ltd.), and the like. A preferred recording medium is the following inkjet recording medium: Ultra Premium Photo Paper Glossy (Shashin-youshi Kurisupia <Koukoutaku> (KA420SCK))™ (Seiko Epson Co., Ltd.), gloss value 63 measured in compliance with JIS Z 8741 at an angle of 60° using a gloss meter (PG-1M manufactured by Nippon Denshoku Industries Co., Ltd.)

The recorded matter of the present invention is one wherein recording is performed by the above inkjet recording method using the inkjet composition with the structure described above.

By using the ink composition of the present invention, this recorded matter has excellent print quality, excellent print stability, beautiful color, and can sustain this beautiful color over a long period of time.

EXAMPLES

The present invention is described in detail below using examples and comparative examples.

However, the present invention is by no means limited to the following examples.

Examples 1 to 8 and Comparative Examples 1 to 5

The ink compositions of Examples 1 to 8 and Comparative Examples 1 to 5 were prepared by mixing and dissolving the ingredients at the ratios shown in Table 2, and then performing pressure filtration using a membrane filter with a pore diameter of 1 μm. The salts in Formula 1-1, Formula 1-2, and Formula -3 of Table 2 had the ratio Li:Na=8:2, and the salts in Formula 2-1, Formula 2-2, Formula 2-3, and Formula 2-4 were all Li salts.

In the Comparative Examples ink compositions were prepared using C.I. Direct Black 154.

TABLE 2

| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| COLORANT | COMPOUND REPRESENTED BY FORMULA 1-1 | 3 | — | — | — | — | — | — | — |
| | COMPOUND REPRESENTED BY FORMULA 1-2 | — | 3 | — | 3 | — | — | 5 | 1 |
| | COMPOUND REPRESENTED BY FORMULA 1-3 | — | — | 3 | — | 4 | 2 | — | — |
| | COMPOUND REPRESENTED BY FORMULA 2-1 | — | 3 | — | — | — | — | — | — |
| | COMPOUND REPRESENTED BY FORMULA 2-2 | — | — | 3 | — | — | — | — | — |
| | COMPOUND REPRESENTED BY FORMULA 2-3 | 3 | — | — | — | 2 | 4 | 1 | 5 |
| | COMPOUND REPRESENTED BY FORMULA 2-4 | — | — | — | 3 | — | — | — | — |
| | C.I. DIRECT BLACK 154 | — | — | — | — | — | — | — | — |
| GLYCERIN | | 10 | 10 | 10 | 10 | 10 | 10 | 10 | 10 |
| TRIETHYLENE GLYCOL | | 5 | 5 | 5 | 5 | 5 | 5 | 5 | 5 |
| 2-PYRROLIDONE | | 3 | 3 | 3 | 3 | 3 | 3 | 3 | 3 |
| OLEFINE E1010 (NISSIN CHEMICAL INDUSTRY Co., Ltd.) | | 1 | 1 | 1 | 1 | 1 | 1 | 1 | 1 |
| TRIETHYLENEGLYCOL MONO-N-BUTYL ETHER | | 10 | 10 | 10 | 10 | 10 | 10 | 10 | 10 |
| ADIPIC ACID | | 0.03 | 0.03 | 0.03 | 0.03 | 0.03 | 0.03 | 0.03 | 0.03 |
| TRI-ISO-PROPANOLAMINE | | 0.1 | 0.1 | 0.1 | 0.1 | 0.1 | 0.1 | 0.1 | 0.1 |
| WATER | | REMAINDER | REMAINDER | REMAINDER | REMAINDER | REMAINDER | REMAINDER | REMAINDER | REMAINDER |
| pH | | 7.6 | 7.6 | 7.6 | 7.6 | 7.6 | 7.6 | 7.6 | 7.6 |

| | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|
| COLORANT | COMPOUND REPRESENTED BY FORMULA 1-1 | — | — | — | — | — |
| | COMPOUND REPRESENTED BY FORMULA 1-2 | 6 | — | — | — | — |
| | COMPOUND REPRESENTED BY FORMULA 1-3 | — | — | — | 3 | — |
| | COMPOUND REPRESENTED BY FORMULA 2-1 | — | — | — | — | 3 |
| | COMPOUND REPRESENTED BY FORMULA 2-2 | — | — | — | — | — |
| | COMPOUND REPRESENTED BY FORMULA 2-3 | — | 6 | — | — | — |
| | COMPOUND REPRESENTED BY FORMULA 2-4 | — | — | — | — | — |
| | C.I. DIRECT BLACK 154 | — | — | 6 | 3 | 3 |
| GLYCERIN | | 10 | 10 | 10 | 10 | 10 |
| TRIETHYLENE GLYCOL | | 5 | 5 | 5 | 5 | 5 |
| 2-PYRROLIDONE | | 3 | 3 | 3 | 3 | 3 |
| OLEFINE E1010 (NISSIN CHEMICAL INDUSTRY Co., Ltd.) | | 1 | 1 | 1 | 1 | 1 |
| TRIETHYLENEGLYCOL MONO-N-BUTYL ETHER | | 10 | 10 | 10 | 10 | 10 |
| ADIPIC ACID | | 0.03 | 0.03 | 0.03 | 0.03 | 0.03 |
| TRI-ISO-PROPANOLAMINE | | 0.1 | 0.1 | 0.1 | 0.1 | 0.1 |
| WATER | | REMAINDER | REMAINDER | REMAINDER | REMAINDER | REMAINDER |
| pH | | 7.6 | 7.6 | 7.6 | 7.6 | 7.6 |

The ink compositions of Examples 1 to 8 and Comparative Examples 1 to 5 were placed into cartridges (black) for an PM-A700 inkjet printer (Seiko Epson Co., Ltd.), printing was performed using an inkjet recording medium (Premium Presentation Paper Matte (Fotomattoshi (KA450PM))™ manufactured by Seiko Epson Co., Ltd.; Ultra Premium Photo Paper Glossy (Shashin-youshi Kurisupia <Koukoutaku> (KA420SCK))™ manufactured by Seiko Epson Co., Ltd.; and Premium Photo Paper Glossy ((Shashin-youshi <Koutaku> (KA420PSK)))™ manufactured by Seiko Epson Co., Ltd.), and an evaluation was performed. The results are shown in Table 3.

TABLE 3

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| BRONZING (23° C., 50% RH) | A | A | A | A | A | A | B | B |
| COLOR (PM MATTE PAPER) | B | B | B | B | B | B | A | B |
| LIGHT FASTNESS | A | A | A | A | A | A | A | A |
| OZONE FASTNESS | A | A | A | A | A | A | B | A |

|  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| BRONZING (23° C., 50% RH) | C | B | A | A | A |
| COLOR (PM MATTE PAPER) | A | C | — | — | — |
| LIGHT FASTNESS | A | A | D | C | C |
| OZONE FASTNESS | B | A | C | C | C |

Evaluation of Bronzing

A printed product was evaluated visually based on the scoring criteria listed below. The printed product was obtained using the above cartridge by setting the printer driver for monochrome printing and performing solid printing on an inkjet recording medium (Ultra Premium Photo Paper Glossy ((Shashin-youshi Kurisupia <Koukoutaku> (KA420SCK)))™ manufactured by Seiko Epson Co., Ltd., gloss value 63 measured in compliance with JIS Z 8741 at an angle of 60° using gloss meter model PG-1M manufactured by Nippon Denshoku Industries Co., Ltd.) so that the ink weight was 1.5 to 2.2 mg/cm². The printing environment was 23° C. and 50% RH.

A: No visible bronzing

B. Slight bronzing visible

C: Conspicuous bronzing

Evaluation of Color

Solid printing was performed using the above cartridge by setting the printer driver for monochrome printing and printing on an inkjet recording medium (Premium Presentation Paper Matte (Fotomattoshi (KA450PM))™ manufactured by Seiko Epson Co., Ltd.) so that the ink weight was 1.5 to 2.2 mg/cm².

The OD value of each printed product was measured using a densitometer (Spectrolino manufactured by Gretag-Macbeth AG). The scoring criteria for color were as follows:

A: OD≧2.3

B: 1.7≦OD<2.3

C: 1.1≦OD<1.7

D: OD<1.1

Evaluation of Light Fastness

A printed product was obtained using the above cartridge by setting the printer driver for monochrome printing and performing printing on an inkjet recording medium (Premium Photo Paper Glossy ((Shashin-youshi <Koutaku> (KA420PSK))™ manufactured by Seiko Epson Co., Ltd.) with printing duty adjusted so that the optical density (OD) fell within a range of 0.9 to 1.1. Using a Fluorescent Light Fastness Test Apparatus (model SFT-II manufactured by Suga Test Instruments Co., Ltd.), the printed product was exposed to light for 21 days at 24° C., 60% RH, and 70,000 lux.

After exposure, the OD value of each printed product was measured using a reflection densitometer (Spectrolino manufactured by Gretag-Macbeth AG), the relict optical density (ROD) was determined by the following formula, and an evaluation was performed using the following scoring criteria.

ROD (%)=(D/D$_0$)×100

D: OD after exposure test

D$_0$: OD before exposure test (Measurement conditions: light source unfiltered, light source: D50, angular field of view 2°)

Scoring Criteria

A: ROD≧80%

B: 60%≦ROD<80%

C: 40%≦ROD<60%

D: ROD<40%

Evaluation of Ozone Fastness

Using an Ozone Weather Meter (model OMS-H manufactured by Suga Test Instruments Co., Ltd.) the above recorded matter was exposed to ozone for 24 hours at 24° C., 60% RH, and ozone concentration of 10 ppm. The optical density (OD) of the printed product after exposure to ozone was measured using a reflection densitometer (Spectrolino manufactured by Gretag-Macbeth AG). The measurement was performed with a light source of D50, unfiltered light source, absolute white was used as the white color standard, and the angular field of view was 2°. Using the same calculation method and the same scoring criteria used in the above evaluation of light fastness, the results were used to evaluate ozone fastness of the recorded matter on a scale of A to D.

Examples 9 to 20 and Comparative Examples 6 and 7

The ink compositions of Examples 9 to 20 and Comparative Examples 6 and 7 were prepared by mixing and dissolving the ingredients at the ratios shown in Table 4, and then performing pressure filtration using a membrane filter with a pore diameter of 1 μm. Evaluations were performed in the same manner as in Examples 1 to 7, and the results are shown in Table 5.

TABLE 4

|  |  | EXAMPLE 9 | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|---|
| COLORANT | COMPOUND REPRESENTED BY FORMULA 1-1 | 3 | 3 | 3 | 3 | 3 | 3 | 3 | 3 |
|  | COMPOUND REPRESENTED BY FORMULA 2-3 | 3 | 3 | 3 | 3 | 3 | 3 | 3 | 3 |
|  | COMPOUND REPRESENTED BY FORMULA 8-1 | — | 1 | 1 | 1 | 1 | — | 1 | — |
|  | COMPOUND REPRESENTED BY FORMULA 8-2 | — | — | — | — | — | 1 | — | — |
|  | C.I. Direct Yellow 86 | — | 0.4 | 0.4 | 0.4 | 0.4 | 0.4 | — | 0.4 |
|  | C.I. Direct Brown 195 | — | — | — | — | — | — | — | 1 |
|  | C.I. Direct Red 225 | — | — | — | — | — | — | — | — |
| GLYCERIN |  | 10 | 10 | 10 | 10 | 10 | 10 | 10 | 10 |
| TRIETHYLENE GLYCOL |  | 5 | 5 | 5 | 5 | 5 | 5 | 5 | 5 |
| 2-PYRROLIDONE |  | 3 | 3 | 3 | 3 | 3 | 3 | 3 | 3 |
| OLEFINE E1010 (NISSIN CHEMICAL INDUSTRY Co., Ltd.) |  | 1 | 1 | 1 | 1 | 1 | 1 | 1 | 1 |
| TRIETHYLENE GLYCOL MONO-N-BUTYL ETHER |  | 8 | 8 | 8 | 8 | 8 | 8 | 8 | 8 |
| 1,2-HEXANE DIOL |  | 2 | 2 | 2 | 2 | 2 | 2 | 2 | 2 |
| ADIPIC ACID |  | 0.03 | 0.03 | — | — | — | 0.03 | 0.03 | 0.03 |
| TRI-ISO-PROPANOLAMINE |  | 0.1 | 0.1 | 0.1 | 0.6 | — | 0.1 | 0.1 | 0.1 |
| TRIETHANOLAMINE |  | — | — | — | — | — | — | — | — |
| WATER |  | REMAINDER | REMAINDER | REMAINDER | REMAINDER | REMAINDER | REMAINDER | REMAINDER | REMAINDER |
| pH |  | 7.6 | 7.6 | 8.0 | 8.4 | 7.7 | 7.6 | 7.6 | 7.6 |

|  |  | EXAMPLE 17 | EXAMPLE 18 | EXAMPLE 19 | EXAMPLE 20 | COMPARATIVE EXAMPLE 6 | COMPARATIVE EXAMPLE 7 |
|---|---|---|---|---|---|---|---|
| COLORANT | COMPOUND REPRESENTED BY FORMULA 1-1 | 3 | 3 | 3 | 5 | 6 | — |
|  | COMPOUND REPRESENTED BY FORMULA 2-3 | 3 | 3 | 3 | 5 | — | 6 |
|  | COMPOUND REPRESENTED BY FORMULA 8-1 | — | — | 1 | 2 | — | — |
|  | COMPOUND REPRESENTED BY FORMULA 8-2 | — | — | — | — | — | — |
|  | C.I. Direct Yellow 86 | 0.4 | 0.4 | 0.4 | 1 | — | — |
|  | C.I. Direct Brown 195 | — | — | — | — | — | — |
|  | C.I. Direct Red 225 | 1 | 3 | — | — | — | — |
| GLYCERIN |  | 10 | 10 | 10 | 10 | 10 | 10 |
| TRIETHYLENE GLYCOL |  | 5 | 5 | 5 | 5 | 5 | 5 |
| 2-PYRROLIDONE |  | 3 | 3 | 3 | 3 | 3 | 3 |
| OLEFINE E1010 (NISSIN CHEMICAL INDUSTRY Co., Ltd.) |  | 1 | 1 | 1 | 1 | 1 | 1 |
| TRIETHYLENE GLYCOL MONO-N-BUTYL ETHER |  | 8 | 8 | 8 | 8 | 8 | 8 |
| 1,2-HEXANE DIOL |  | 2 | 2 | 2 | 2 | 2 | 2 |
| ADIPIC ACID |  | 0.03 | 0.03 | — | 0.03 | 0.03 | 0.03 |
| TRI-ISO-PROPANOLAMINE |  | 0.1 | 0.1 | — | 0.1 | 0.1 | 0.1 |
| TRIETHANOLAMINE |  | — | — | 0.8 | — | — | — |
| WATER |  | REMAINDER | REMAINDER | REMAINDER | REMAINDER | REMAINDER | REMAINDER |
| pH |  | 7.6 | 7.6 | 8.6 | 7.5 | 7.6 | 7.6 |

TABLE 5

|  | EXAMPLE 9 | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|
| BRONZING (23° C., 50% RH) | A | A | A | A | A | — | A | B |
| BRONZING (35° C., 50% RH) | — | A | A | A | A | B | — | C |
| COLOR CRISPIA ™ PHOTOGRAPHIC PAPER | B | A | A | A | A | A | A | B |
| PM MATTE PAPER | B | B | B | B | B | B | B | B |
| HUE | STRONG BLUISH HUE | DESIRABLE HUE | DESIRABLE HUE | DESIRABLE HUE | DESIRABLE HUE | DESIRABLE HUE | SLIGHTLY BLUISH HUE | DESIRABLE HUE |
| LIGHT FASTNESS | A | A | A | A | A | A | A | A |
| OZONE FASTNESS | A | A | A | A | A | A | A | A |
| CLOGGING | A | A | A | A | A | A | A | A |
| DECOMPOSITION | A | A | A | B | A | A | A | A |

|  | EXAMPLE 17 | EXAMPLE 18 | EXAMPLE 19 | EXAMPLE 20 | COMPARATIVE EXAMPLE 6 | COMPARATIVE EXAMPLE 7 |
|---|---|---|---|---|---|---|
| BRONZING (23° C., 50% RH) | B | B | A | — | C | B |
| BRONZING (35° C., 50% RH) | C | C | A | B | — | — |
| COLOR CRISPIA ™ PHOTOGRAPHIC PAPER | B | B | A | A | B | B |
| PM MATTE PAPER | B | B | B | A | A | C |
| HUE | BLUISH HUE | DESIRABLE HUE | DESIRABLE HUE | DESIRABLE HUE | STRONG BLUISH HUE | STRONG GREENISH HUE |
| LIGHT FASTNESS | A | A | A | A | A | A |
| OZONE FASTNESS | A | A | A | A | B | A |
| CLOGGING | A | B | A | C | A | A |
| DECOMPOSITION | A | A | C | A | — | — |

The evaluation methods and scoring criteria for light fastness and ozone fastness in Table 5 are the same as those in Table 3.

Evaluation of Bronzing

A printed product was evaluated visually based on the scoring criteria listed below. The printed product was obtained using the above cartridge by setting the printer driver for monochrome printing and performing solid printing on an inkjet recording medium (Ultra Premium Photo Paper Glossy ((Shashin-youshi Kurisupia <Koukoutaku> (KA420SCK)))™ manufactured by Seiko Epson Co., Ltd., gloss value 63 measured in compliance with JIS Z 8741 at an angle of 60° using gloss meter model PG-1M manufactured by Nippon Denshoku Industries Co., Ltd.) so that the ink weight was 1.5 to 2.2 mg/cm². The printing environments were 23° C. and 50% RH, and 35° C. and 50% RH.

A: No visible bronzing

B. Slight bronzing visible

C: Conspicuous bronzing

Evaluation of Color

Solid printing was performed using the above cartridge by setting the printer driver for monochrome printing and printing on an inkjet recording medium (Premium Photo Paper Glossy ((Shashin-youshi <Koutaku> (KA420PSK))™ manufactured by Seiko Epson Co., Ltd.) and Premium Presentation Paper Matte (Fotomattoshi (KA450PM))™ manufactured by Seiko Epson Co., Ltd.) so that the ink weight was 1.5 to 2.2 mg/cm².

The OD value of each printed product was measured using a densitometer (Spectrolino manufactured by Gretag-Macbeth AG).

The scoring criteria for color were as follows:

A: OD≧2.3

B: 1.7≦OD<2.3

C: 1.1≦OD<1.7

D: OD<1.1

Evaluation of Hue

The evaluation of hue was performed visually based on nearness to achromicity.

Evaluation of Clogging

Using the above cartridge, after printing was performed continuously for 10 minutes to verify that all nozzles were ejecting properly, the printer was let stand for 21 days at 60° C. and 15% RH. After 21 days had elapsed, cleaning was performed until all nozzles ejected at the initial level, and an evaluation was performed using the following scoring criteria.

Scoring Criteria

A: Recovery to initial level when power turned on or with 1 to 4 cleanings

B: Recovery to initial level with 5 to 8 cleanings

C: Recovery to initial level with 9 to 12 cleanings

D: No recovery with 13 cleanings

Evaluation of Decomposition

Each black ink composition was stored for 6 days at 70° C., and an evaluation of dye decomposition was performed using the following method.

Before and after storage for 6 days at 70° C. each black ink composition was diluted by volume 2000-fold using ultra-pure water, and the absorption was measured using a spectrophotometer. A before-after comparison of absorption at the maximum absorption wavelength of the ink composition before storage was performed, and the change in absorption was calculated as the residual rate using the following formula.

Residual rate(%)=(absorption after storage/absorption before storage)×100

The following scoring criteria were used.

A: Residual rate ≧95%

B: 93%≦Residual rate <95%

C: 90%≦Residual rate <93%

D: Residual rate <90%

INDUSTRIAL APPLICABILITY

The black ink composition, ink set and ink cartridge of the present invention can be used as a black ink composition, ink set, and ink cartridge especially for an inkjet printer. The inkjet recording method and recorded matter using the above black ink composition can be used as an inkjet recording method and recorded matter with suppressed bronzing.

What is claimed is:

1. A black ink composition comprising a colorant represented by Formula 1 below and a colorant represented by Formula 2 below:

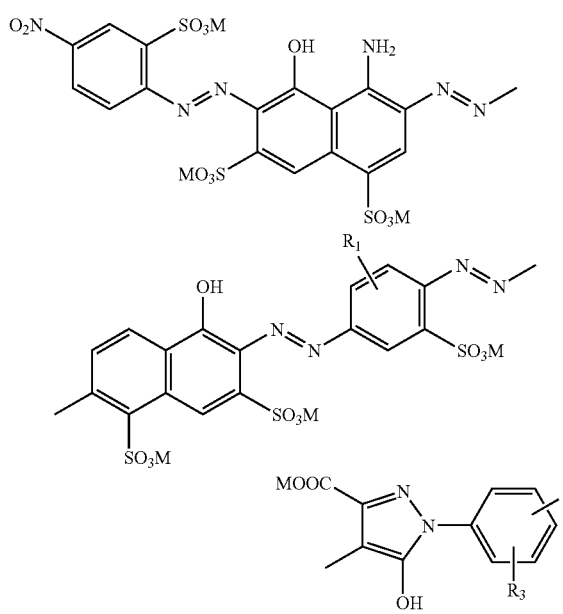

FORMULA 1 wherein $R_1$ represents either a halogen atom, H, $SO_3M$ or COOM, $R_2$ and $R_3$ each independently represent H, $SO_3M$ or COOM, and M represents Li or Na, with the proviso that, a structure in which both $R_2$ and $R_3$ are H is excluded therefrom;

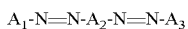

FORMULA 2 wherein $A_1$ is a substituent represented by Formula 3 or Formula 4 below, $A_2$ is a substituent represented by Formula 5 or Formula 6 below, and $A_3$ is a substituent represented by Formula 7 below;

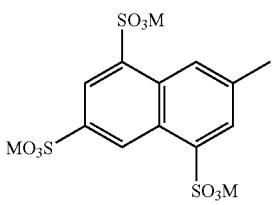

FORMULA 3 wherein M represents Li or Na;

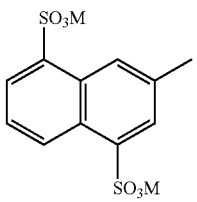

FORMULA 4 wherein M represents Li or Na;

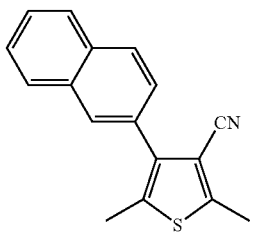

FORMULA 5

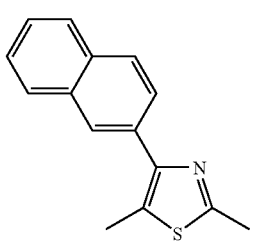

FORMULA 6

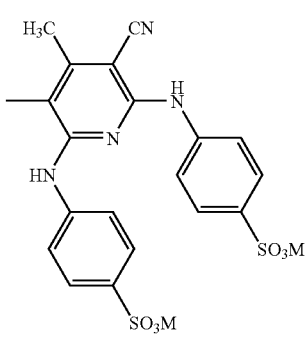

FORMULA 7 wherein M represents Li or Na.

2. The black ink composition according to claim 1, wherein the total of the content of the colorant represented by Formula 1 and the content of the colorant represented by Formula 2 is 5 to 8 wt.% of the ink composition.

3. The black ink composition according to claim 1, wherein the content ratio of the colorant represented by Formula 1 to the colorant represented by Formula 2 is 2:1 to 1:2.

4. The black ink composition according to claim 1, further containing a colorant represented by Formula 8 below:

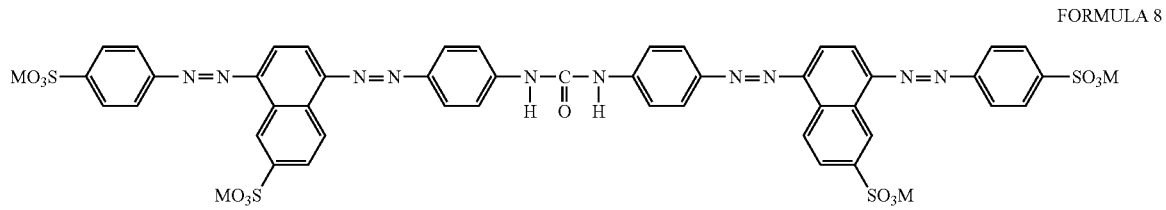

FORMULA 8 wherein M represents Li or Na.

5. The black ink composition according to claim 4, wherein the colorant represented by Formula 8 is the colorant represented by Formula 8-1:

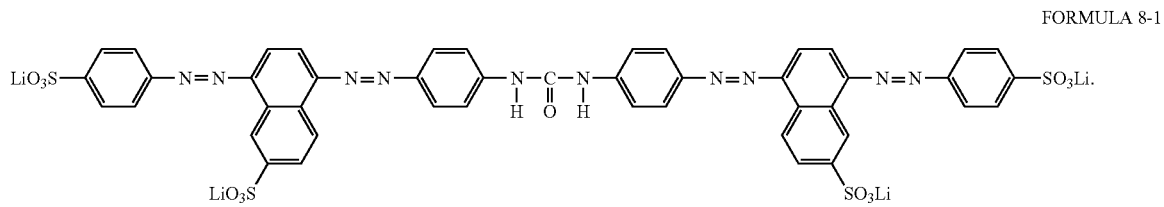

FORMULA 8-1

6. The black ink composition according to claim 1, further containing C.I. Direct Yellow 86 as a colorant.

7. The black ink composition according to claim 1, containing a nonionic surfactant.

8. The black ink composition according to claim 7, wherein the nonionic surfactant is an acetylene glycol surfactant.

9. The black ink composition according to claim 7, containing 0.1 to 5 wt.% nonionic surfactant.

10. The black ink composition according to claim 1, further containing a penetration enhancer.

11. The black ink composition according to claim 10, wherein the penetration enhancer is a glycol ether.

12. The black ink composition according to claim 1, wherein pH is 7.0 to 8.5 at 20° C immediately after preparation of the ink composition.

13. The black ink composition according to claim 1, containing an organic acid and/or an organic base as a pH regulator.

14. An ink cartridge accommodating the black ink composition according to claim 1 independently or integrally with ink of another color.

15. An inkjet recording method wherein recording is performed by ejecting droplets of the black ink according to claim 1 and causing the same to adhere to a recording medium.

16. The inkjet recording method according to claim 15 that is a recording method comprising an inkjet head in which ink droplets are formed by mechanical deformation of a piezoelectric element.

17. A recorded matter recorded by the inkjet recording method according to claim 15.

* * * * *